(12) United States Patent
Wang et al.

(10) Patent No.: US 12,265,852 B1
(45) Date of Patent: Apr. 1, 2025

(54) RESOURCE ALLOCATION METHOD AND APPARATUS FOR PERIPHERAL, SERVER, AND STORAGE MEDIUM

(71) Applicant: Suzhou MetaBrain Intelligent Technology Co., Ltd., Jiangsu (CN)

(72) Inventors: Shuxian Wang, Jiangsu (CN); Fanyi Yao, Jiangsu (CN); Bing Wang, Jiangsu (CN); Yuqi Tan, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/859,208

(22) PCT Filed: Jul. 12, 2023

(86) PCT No.: PCT/CN2023/107011
§ 371 (c)(1),
(2) Date: Oct. 23, 2024

(87) PCT Pub. No.: WO2024/113884
PCT Pub. Date: Jun. 6, 2024

(30) Foreign Application Priority Data

Nov. 30, 2022 (CN) .......................... 202211519340.6

(51) Int. Cl.
*G06F 9/46* (2006.01)
*G06F 9/4401* (2018.01)
*G06F 9/50* (2006.01)

(52) U.S. Cl.
CPC .......... *G06F 9/5027* (2013.01); *G06F 9/4401* (2013.01)

(58) Field of Classification Search
CPC .............................. G06F 9/5027; G06F 9/4401
See application file for complete search history.

(56) References Cited

U.S. PATENT DOCUMENTS

2015/0149660 A1  5/2015  Huang et al.

FOREIGN PATENT DOCUMENTS

| CN | 107193760 A | 9/2017 |
| CN | 107566174 A | 1/2018 |
| CN | 107861790 A | 3/2018 |

(Continued)

OTHER PUBLICATIONS

International Search Report of corresponding PCT application (PCT/CN2023/107011) Oct. 24, 2023, 5 pages.

(Continued)

*Primary Examiner* — Gregory A Kessler
(74) *Attorney, Agent, or Firm* — Cooper Legal Group, LLC

(57) ABSTRACT

The present application discloses a resource allocation method for a peripheral, including: determining identification information of all network card devices from acquired peripheral information; establishing a special device list on the basis of the identification information; and performing resource allocation on a currently connected device on the basis of a boot mode of a basic input output system (BIOS) and the special device list. The identification information of all the network card devices is acquired, then the special device list is identified, and finally, on the basis of the boot mode and the special device list, resource allocation is performed on a network card device which is a special device. The present application further discloses a resource allocation apparatus for the peripheral, a server, and a non-volatile computer readable storage medium, which have the described beneficial effects.

20 Claims, 3 Drawing Sheets

(56) References Cited

FOREIGN PATENT DOCUMENTS

| | | | |
|---|---|---|---|
| CN | 110045991 | A | 7/2019 |
| CN | 110399217 | A | 11/2019 |
| CN | 112860330 | A | 5/2021 |
| CN | 113190279 | A | 7/2021 |
| CN | 113791905 | A | 12/2021 |
| CN | 114860268 | A | 8/2022 |
| CN | 115664953 | A | 1/2023 |

OTHER PUBLICATIONS

Written Opinion of International Searching Authority of corresponding PCT application (PCT/CN2023/107011) Oct. 24, 2023, 9 pages.
First CN Office Action of corresponding CN priority application (CN202211519340.6), mailed Mar. 2, 2023, 12 pages.
Notification to Grant Patent Right for Invention of corresponding CN priority application (CN202211519340.6) Apr. 28, 2024, 3 pages.

RESOURCE ALLOCATION METHOD AND APPARATUS FOR PERIPHERAL, SERVER, AND STORAGE MEDIUM

CROSS-REFERENCE TO RELATED APPLICATION

This application claims priority to Chinese Patent Application No. 202211519340.6, entitled "Resource Allocation Method for Peripheral, and Related Apparatus", filed to China National Intellectual Property Administration on Nov. 30, 2022, the entire contents of which are incorporated herein by reference.

FIELD

The present application relates to the technical field of computers, and particularly to a resource allocation method and apparatus for a peripheral, a server, and a non-volatile computer readable storage medium.

BACKGROUND

In a computer system, a Basic Input Output System (BIOS), as the most basic and direct manager of the hardware setting and control of the server motherboard, can provide the server with more simple and easy-to-use functions. Visualization of the identification of some hardware devices on the server can be achieved through the BIOS, which makes the use of the hardware devices more feasible. A network card device is a common device of the server and is generally configured for the connection between the server and a network device such as a switch.

In the related art, resource allocation errors are likely to occur in a general resource allocation process, resulting in a problem of reduced reliability.

SUMMARY

An object of the present application is to provide a resource allocation method and apparatus for a peripheral, a server, and a non-volatile computer readable storage medium so as to improve the reliability of resource allocation and avoid the problem of errors in resource allocation.

In order to solve the above-mentioned technical problem, the present application provides a resource allocation method for a peripheral, including:
 determining identification information of all network card devices from acquired peripheral information;
 establishing a special device list on the basis of the identification information; and
 performing resource allocation on a currently connected device on the basis of a boot mode of a BIOS and the special device list.

In some embodiments, the determining identification information of all network card devices from acquired peripheral information includes:
 acquiring peripheral information of all peripherals through a peripheral component interconnection standard protocol; and
 acquiring the identification information of all the network card devices from the peripheral information.

In some embodiments, the acquiring the identification information of all the network card devices from the peripheral information includes:
 acquiring information of all the network card devices from the peripheral information; and
 acquiring Vendor Identification (VID) information and Device Identification (DID) information from the information of all the network card devices as corresponding identification information.

In some embodiments, the acquiring peripheral information of all peripherals through a peripheral component interconnection standard protocol includes: acquiring the peripheral information of all the peripherals through the peripheral component interconnection standard protocol and corresponding interfaces.

In some embodiments, the determining identification information of all network card devices from acquired peripheral information includes:
 determining VID information and DID information of all connected network card devices from the acquired peripheral information; and
 taking the VID information and the DID information as corresponding identification information.

In some embodiments, the establishing a special device list on the basis of the identification information includes:
 identifying special network card devices from the identification information; and
 establishing the special device list on the basis of all identified special network card devices.

In some embodiments, the identifying special network card devices from the identification information includes:
 identifying the special network card devices on the basis of VID information and DID information of the identification information.

In some embodiments, the identifying special network card devices from the identification information includes:
 performing mode simulation on all the network card devices corresponding to the identification information, determining network card devices only supporting low-level resources, and taking the network card devices of the low-level resources as the special network card devices.

In some embodiments, the establishing the special device list on the basis of all identified special network card devices includes:
 establishing the special device list on the basis of VID information and DID information of the special network card devices.

In some embodiments, the performing resource allocation on a currently connected device on the basis of a boot mode of a BIOS and the special device list includes:
 acquiring the boot mode of the BIOS, wherein the boot mode includes a 64-bit resource boot mode and a 32-bit resource boot mode; and
 performing resource allocation on a currently connected network card device on the basis of the boot mode and the special device list.

In some embodiments, the performing resource allocation on a currently connected network card device on the basis of the boot mode and the special device list includes:
 allocating resources of 32 bits or more to the currently connected network card device when the boot mode is the 64-bit resource boot mode; and
 allocating resources of 32 bits or less to network card devices matching the special device list when the boot mode is the 32-bit resource boot mode.

In some embodiments, the performing resource allocation on a currently connected network card device on the basis of the boot mode and the special device list includes:
 allocating resources of 32 bits or more to the currently connected network card device when the boot mode is a Unified Extensible Firmware Interface (UEFI) mode;

and allocating resources of 32 bits or less to network card devices matching the special device list when the boot mode is a Legacy mode.

In some embodiments, the allocating resources of 32 bits or less to network card devices matching the special device list includes:

determining whether the identification information of the network card device matches the identification information in the special device list; and allocating resources of 32 bits or less to the network card device if the identification information of the network card device matches the identification information in the special device list.

In some embodiments, the resource allocation method further includes:

allocating resources of 32 bits or more to the network card device when the identification information of the network card device does not match the identification information in the special device list.

In some embodiments, the acquiring the boot mode of the BIOS includes: acquiring the boot mode of the BIOS through a system variable value.

In some embodiments, the acquiring the boot mode of the BIOS includes: acquiring the boot mode of the BIOS through a Get Variable function.

In some embodiments, the resource allocation method further includes: booting a system through a Preboot execution Environment (PXE) after the resource allocation is completed.

The present application also provides a resource allocation apparatus for a peripheral, including:

an identification information acquisition module, configured to determine identification information of all network card devices from acquired peripheral information;

a list acquisition module, configured to establish a special device list on the basis of the identification information; and a resource allocation module, configured to perform resource allocation on a currently connected device on the basis of a boot mode of a BIOS and the special device list.

The present application also provides a server, including:
a memory, configured to store a computer program; and
a processor, configured to implement the steps of the above resource allocation method when executing the computer program.

The present application also provides a non-volatile computer readable storage medium, having stored thereon a computer program which, when executed by a processor, implements the steps of the above resource allocation method.

The resource allocation method for a peripheral provided by the present application includes: determining the identification information of all the network card devices from the acquired peripheral information; establishing the special device list on the basis of the identification information; and performing resource allocation on the currently connected device on the basis of the boot mode of the BIOS and the special device list.

The identification information of all the network card devices is acquired, then the special device list is identified, and finally, on the basis of the boot mode and the special device list, resource allocation is performed on a network card device which is a special device, thereby avoiding the problem of errors in resource allocation, and improving the effect and reliability of resource allocation.

The present application also provides a resource allocation apparatus for the peripheral, a server, and a non-volatile computer readable storage medium, which have the above beneficial effects and are not described in detail herein.

BRIEF DESCRIPTION OF THE DRAWINGS

In order to more clearly illustrate the technical solutions in the embodiments of the present application or in the related art, the drawings required in the descriptions of the embodiments or the related art will be briefly introduced below. Obviously, the drawings described below are only embodiments of the present application, and a person skilled in the art may obtain other drawings according to these drawings without involving any inventive effort.

DETAILED DESCRIPTION

The core of the present application is to provide a resource allocation method and apparatus for a peripheral, a server, and a non-volatile computer readable storage medium so as to improve the reliability of resource allocation and avoid the problem of errors in resource allocation.

In order to make the object, technical solutions, and advantages of the embodiments the present application clearer, the technical solutions in the embodiments of the present application will be clearly and completely described below in conjunction with the accompanying drawings in the embodiments of the present application.

Obviously, the described embodiments are only some embodiments of the present application, not all embodiments. Based on the embodiments of the present application, all other embodiments obtained by a person skilled in the art without inventive effort fall within the scope of the present application.

In the related art, booting through a PXE enables a server to boot through a network, and the PXE provides a guiding method capable of guiding the server to boot through a network, but requires the server to contain a network card capable of supporting the PXE booting. When the server guides the PXE to boot, the server calls a PXE protocol in a network card Read-Only Memory (Rom) into the memory to perform the guiding, and the PXE protocol downloads remote files or boot items to the local for running through a network. BIOS guiding modes of the server are divided into an UEFI mode and a Legacy (traditional boot mode under BIOS) mode, and the OpRom (peripheral memory) of the network card is also divided into UEFI OpRom and Legacy OpRom modes. Some network cards may support an address space beyond 32 bits in the UEFI mode, but in the Legacy mode, the Oprom of network card device cannot support the address space beyond 32 bits, and only an address space within 32 bits can be allocated to support the PXE function of the network card. Therefore, resource allocation errors are likely to occur in a general resource allocation process, resulting in a problem of reduced reliability.

Therefore, the present application provides a resource allocation method for a peripheral. The identification information of all the network card devices is acquired, then the special device list is identified, and finally, on the basis of the boot mode and the special device list, resource allocation is performed on a network card device which is a special device, thereby avoiding the problem of errors in resource allocation, and improving the effect and reliability of resource allocation.

The resource allocation method for a peripheral provided by the present application is described below through an embodiment.

Figure 1:
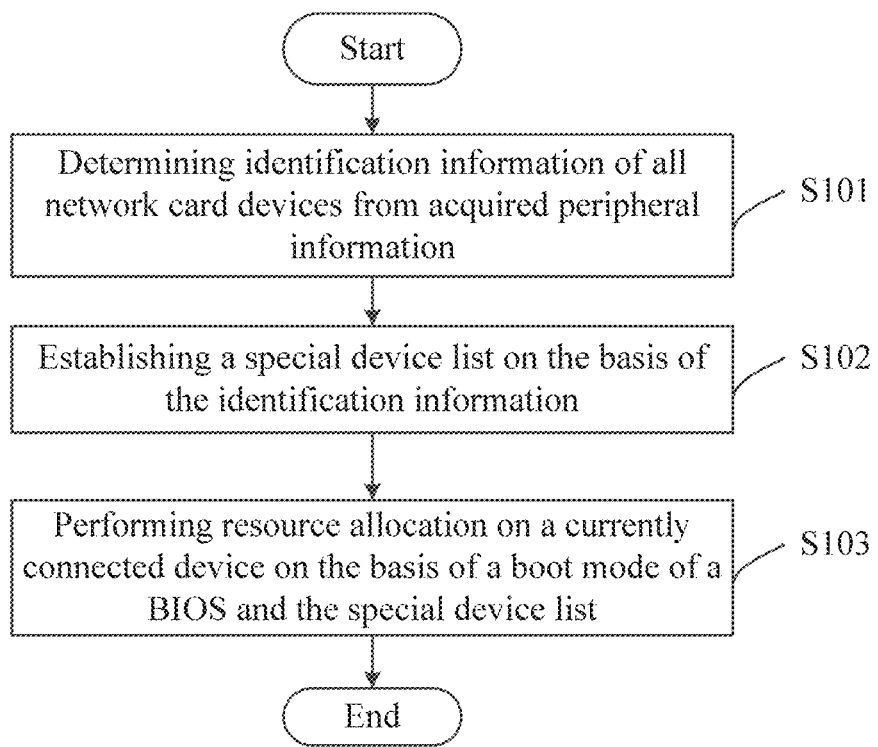
FIG. 1 is a flowchart of a resource allocation method for a peripheral provided by an embodiment of the present application.

Referring to FIG. 1, it is a flowchart of a resource allocation method for a peripheral provided by an embodiment of the present application.

In this embodiment, the method may include the following steps.

At S101, identification information of all network card devices is determined from acquired peripheral information.

It can be seen that this step is intended to determine the identification information of all network card devices from the acquired peripheral information.

That is, the identification information of the network card devices is determined to identify the network card devices.

Further, S101 may include the steps of:
step 1: acquiring peripheral information of all peripherals through a peripheral component interconnection standard protocol; and
step 2: acquiring the identification information of all the network card devices from the peripheral information.

It can be seen that this optional solution mainly describes how to acquire the identification information. In this optional solution, the peripheral information of all the peripherals is acquired through the peripheral component interconnection standard protocol, and the identification information of all the network card devices is acquired from the peripheral information.

Further, in some optional embodiments of the present application, step 2 may include the steps of:
step 2.1: acquiring information of all the network card devices from the peripheral information; and
step 2.2: acquiring VID information and DID information from the information of all the network card devices as corresponding identification information.

It can be seen that this optional solution mainly describes how to acquire the identification information. In this optional solution, the information of all the network card devices is acquired from the peripheral information, and the VID information and the DID information are acquired from the information of all the network card devices as the corresponding identification information.

Further, in some optional embodiments of the present application, step 1 may include the steps of:
acquiring the peripheral information of all the peripherals through the peripheral component interconnection standard protocol and corresponding interfaces.

It can be seen that this optional solution mainly describes how to acquire the peripheral information. In this optional solution, the peripheral information of all the peripherals is acquired through the peripheral component interconnection standard protocol and the corresponding interfaces.

Further, S101 may also include the steps of:
step 3: determining VID information and DID information of all connected network card devices from the acquired peripheral information; and
step 4: taking the VID information and the DID information as corresponding identification information.

It can be seen that this optional solution mainly describes how to acquire the identification information. In this optional solution, the VID information and the DID information of all connected network card devices are determined from the acquired peripheral information, and the VID information and the DID information are taken as the corresponding identification information. That is, the VID information and the DID information are directly acquired from the acquired information.

At S102, a special device list is established on the basis of the identification information.

On the basis of S101, this step is intended to establish the special device list on the basis of the identification information. The special device (special network card device) refers to a network card device with limited allocated resources in a traditional boot mode.

Further, S102 may include the steps of:
step 5: identifying special network card devices from the identification information; and
step 6: establishing the special device list on the basis of all identified special network card devices.

It can be seen that this optional solution mainly describes how to acquire the special device list. In this optional solution, the special network card devices are identified from the identification information, and the special device list is established on the basis of all identified special network card devices. That is, the special network card devices are first identified, and then the special device list is established. It is to be understood that the special device list is used for recording the special network card devices. The special network card device refers to a network card device with limited allocated resources in the traditional boot mode.

Further, in some optional embodiments of the present application, step 5 may include the steps of:
identifying the special network card devices on the basis of VID information and DID information of the identification information.

It can be seen that this optional solution mainly describes how to acquire the special network card device. In this optional solution, the special network card devices are identified on the basis of the VID information and the DID information of the identification information.

Further, in some optional embodiments of the present application, step 5 may also include the steps of:
performing mode simulation on all the network card devices corresponding to the identification information, determining network card devices only supporting low-level resources, and taking the network card devices of the low-level resources as the special network card devices.

It can be seen that this optional solution mainly describes how to acquire the special network card device. In this optional solution, mode simulation is performed on all the network card devices corresponding to the identification information, the network card devices only supporting the low-level resources are determined, and the network card devices of the low-level resources are taken as the special network card devices.

Further, in some optional embodiments of the present application, step 6 may include the steps of:
establishing the special device list on the basis of VID information and DID information of the special network card devices.

It can be seen that this optional solution mainly describes how to acquire the special device list. In this optional solution, the special device list is established on the basis of the VID information and the DID information of the special network card devices.

At S103, resource allocation is performed on a currently connected device on the basis of a boot mode of a BIOS and the special device list.

On the basis of S102, this step is intended to perform resource allocation on the currently connected device on the basis of the boot mode of the BIOS and the special device list.

Further, S103 may include the steps of:
step 7: acquiring the boot mode of the BIOS, wherein the boot mode includes a 64-bit resource boot mode and a 32-bit resource boot mode; and
step 8: performing resource allocation on a currently connected network card device on the basis of the boot mode and the special device list.

It can be seen that this optional solution mainly describes how to perform resource allocation. In this optional solution, the boot mode of the BIOS is acquired, wherein the boot mode includes the 64-bit resource boot mode and the 32-bit resource boot mode; resource allocation is performed on the currently connected network card device on the basis of the boot mode and the special device list. The 32-bit resource boot mode is a traditional boot mode, and there is a problem of resource limitation in this boot mode.

Further, in some optional embodiments of the present application, step 8 may include the steps of:
allocating resources of 32 bits or more to the currently connected network card device when the boot mode is the 64-bit resource boot mode; and
allocating resources of 32 bits or less to network card devices matching the special device list when the boot mode is the 32-bit resource boot mode.

It can be seen that this optional solution mainly describes how to allocate resources in different boot modes. In this optional solution, the resources of 32 bits or more are allocated to the currently connected network card device when the boot mode is the 64-bit resource boot mode, and the resources of 32 bits or less are allocated to the network card devices matching the special device list when the boot mode is the 32-bit resource boot mode.

Further, in some optional embodiments of the present application, step 8 may also include the steps of:
allocating resources of 32 bits or more to the currently connected network card device when the boot mode is an UEFI mode; and
allocating resources of 32 bits or less to network card devices matching the special device list when the boot mode is a Legacy mode.

It can be seen that this optional solution mainly describes how to allocate resources in different boot modes. In this optional solution, the resources of 32 bits or more are allocated to the currently connected network card device when the boot mode is the UEFI mode, and the resources of 32 bits or less are allocated to the network card devices matching the special device list when the boot mode is the Legacy mode.

The process of allocating the resources of 32 bits or less to the network card devices matching the special device list may include:
determining whether the identification information of the network card device matches the identification information in the special device list; allocating resources of 32 bits or less to the network card device if the identification information of the network card device matches the identification information in the special device list; and allocating resources of 32 bits or more to the network card device when the identification information of the network card device does not match the identification information in the special device list.

It can be seen that this optional solution mainly describes how to allocate resources in the traditional mode. In this optional solution, it is determined whether the identification information of the network card device matches the identification information in the special device list, resources of 32 bits or less are allocated to the network card device if the identification information of the network card device matches the identification information in the special device list, and resources of 32 bits or more are allocated to the network card device when the identification information of the network card device does not match the identification information in the special device list.

Further, in some optional embodiments of the present application, step 7 may include the steps of:
acquiring the boot mode of the BIOS through a system variable value.

It can be seen that this optional solution mainly describes how to acquire the boot mode. In this optional solution, the boot mode of the BIOS is acquired through the system variable value.

Further, in some optional embodiments of the present application, step 7 may also include the steps of:
acquiring the boot mode of the BIOS through a GetVariable function.

It can be seen that this optional solution mainly describes how to acquire the boot mode. In this optional solution, the boot mode of the BIOS is acquired through the GetVariable function. The GetVariable function is a function to acquire system variables in the UEFI mode.

Further, this embodiment may further include:
booting a system through a Preboot execution Environment (PXE) after the resource allocation is completed.

It can be seen that this optional solution mainly describes how to boot the system. In this optional solution, the system is booted through the PXE after the resource allocation is completed.

It can be seen that in this embodiment, the identification information of all the network card devices is acquired, then the special device list is identified, and finally, on the basis of the boot mode and the special device list, resource allocation is performed on a network card device which is a special device, thereby avoiding the problem of errors in resource allocation, and improving the effect and reliability of resource allocation.

The resource allocation method for a peripheral provided by the present application is further described below through another specific embodiment.

Figure 2:
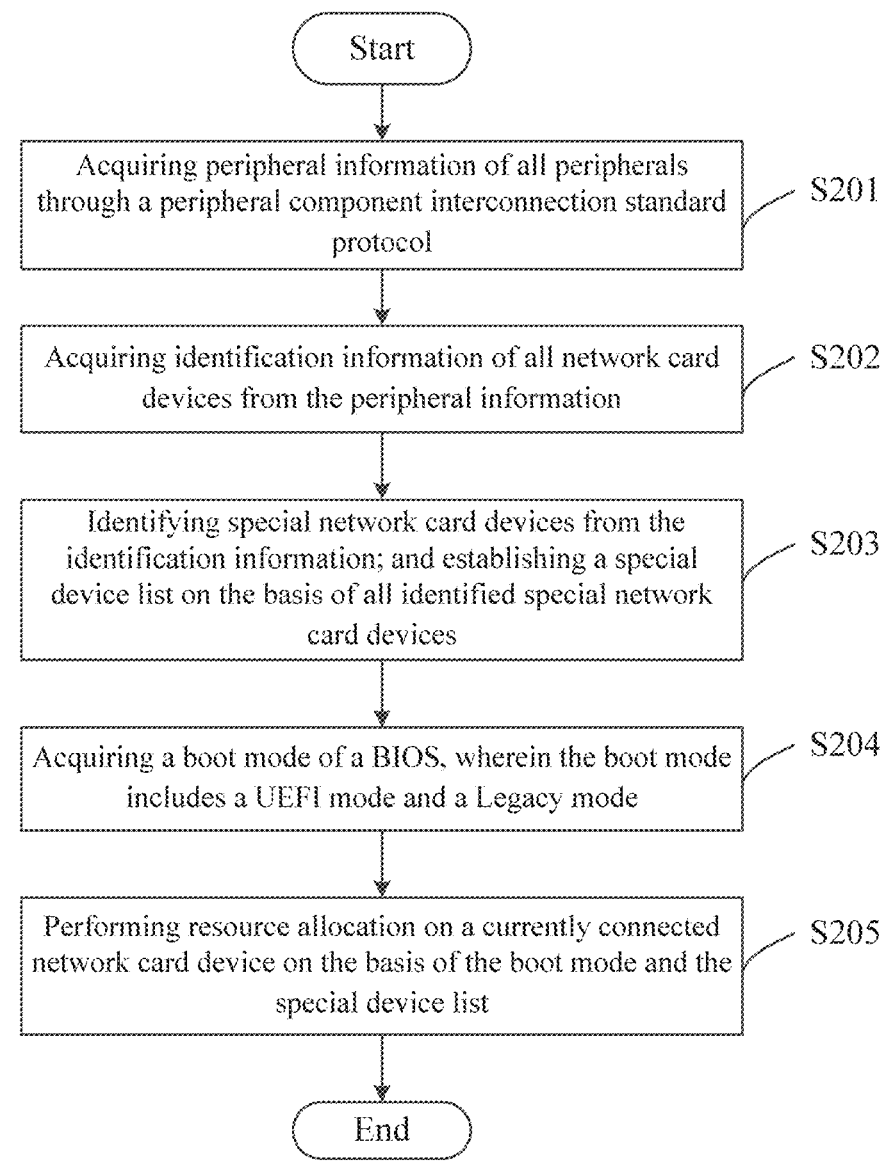
FIG. 2 is a flowchart of another resource allocation method for a peripheral provided by an embodiment of the present application.

Referring to FIG. 2, it is a flowchart of another resource allocation method for a peripheral provided by an embodiment of the present application.

In this embodiment, the method may include the steps of:
S201: acquiring peripheral information of all peripherals through a peripheral component interconnection standard protocol;

S202: acquiring identification information of all network card devices from the peripheral information;

S203: identifying special network card devices from the identification information; and establishing a special device list on the basis of all identified special network card devices;

S204: acquiring a boot mode of a BIOS, wherein the boot mode includes a UEFI mode and a Legacy mode; and S205: performing resource allocation on a currently connected network card device on the basis of the boot mode and the special device list.

The BIOS, as the most basic and direct manager of the hardware setting and control of the server motherboard, can provide the server with more simple and easy-to-use functions. Visualization of the identification of some hardware devices on the server can be achieved through the BIOS, which makes the use of the hardware devices more feasible. A network card device is a common device of the server and is generally configured for the connection between the server and a network device such as a switch. The BIOS guiding modes of the server are divided into UEFI and Legacy modes, and the OpRom of the network card is also divided into UEFI OpRom and Legacy OpRom modes. Some network cards may support an address space beyond 32 bits in the UEFI mode, but in the Legacy mode, the Oprom of network card device cannot support the address space beyond 32 bits, and only an address space within 32 bits can be allocated to support the PXE function of the network card. Since 32-bit address space resources are relatively limited, this embodiment provides a method for automatically detecting and allocating resources. The network card is allocated to a high 32-bit resource in the UEFI mode and a low 32-bit resource in the Legacy mode, ensuring that the network card can work normally in both the UEFI and Legacy modes, normally realizing the PXE booting function, and ensuring that the limited low 32-bit resource is not excessively occupied.

In order to realize the correct allocation of network card resources according to different network card information and BIOS boot modes, this embodiment proposes a resource allocation method. This embodiment includes: acquiring VID and DID of a network card device by acquiring PCI device information; identifying the VID and the DID of the device that can only support resources of 32 bits or less in the Legacy mode; and establishing an array List using the VID and the DID of these special network card devices.

Then, the boot mode of the BIOS is acquired through the form of Get Variable. The boot mode of the BIOS is determined, and if it is the UEFI mode, resources of 32 bits or more are allocated to the network card; if it is the Legacy mode, the array List established according to the VID and the DID of the special network card is loaded. The current VID and DID acquired from the PCI device information are compared with the established VID and DID array List. If the current PCI device information is consistent with the established VID and DID array List, it is indicated that a special device is connected to the machine currently. Finally, resources of 32 bits or less are allocated to the special device.

It can be seen that the present application realizes a method for automatically detecting network card information and controlling resource allocation, and the encoding operation of the method is simple. If it is desired to add a device or reduce a device, the VID and DID array List may be directly modified, and other devices are not mistakenly identified to allocate address space resources of 32 bits or less to the other devices mistakenly, which not only ensures the normal operation of the network card device, but also ensures that the resources of 32 bits or less which are not abundant are not mistakenly allocated to cause unnecessary troubles.

It can be seen that in this embodiment, the identification information of all the network card devices is acquired, then the special device list is identified, and finally, on the basis of the boot mode and the special device list, resource allocation is performed on a network card device which is a special device, thereby avoiding the problem of errors in resource allocation, and improving the effect and reliability of resource allocation.

The resource allocation apparatus for a peripheral provided by the embodiment of the present application is described below, and the resource allocation apparatus for a peripheral described below and the resource allocation method for a peripheral described above may be referred to each other correspondingly.

Figure 3:
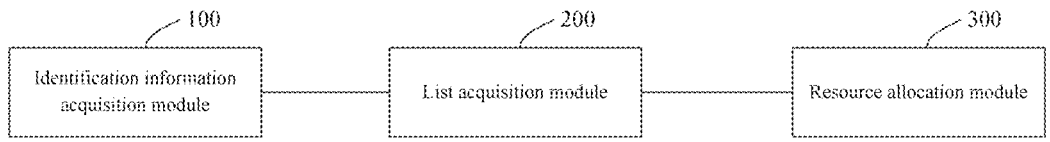
FIG. 3 is a schematic structural diagram of a resource allocation apparatus for a peripheral provided by an embodiment of the present application.

Referring to FIG. 3, it is a schematic structural diagram of a resource allocation apparatus for a peripheral provided by an embodiment of the present application.

In this embodiment, the apparatus may include:
an identification information acquisition module 100, configured to determine identification information of all network card devices from acquired peripheral information;
a list acquisition module 200, configured to establish a special device list on the basis of the identification information; and
a resource allocation module 300, configured to perform resource allocation on a currently connected device on the basis of a boot mode of a BIOS and the special device list.

Optionally, the identification information acquisition module 100 is specifically configured to acquire peripheral information of all peripherals through a peripheral component interconnection standard protocol and acquire the identification information of all the network card devices from the peripheral information.

Optionally, the process of acquiring the identification information of all the network card devices from the peripheral information may include:
acquiring information of all the network card devices from the peripheral information; and acquiring VID information and DID information from the information of all the network card devices as corresponding identification information.

Optionally, acquiring the peripheral information of all peripherals through the peripheral component interconnection standard protocol may include:
acquiring the peripheral information of all the peripherals through the peripheral component interconnection standard protocol and corresponding interfaces.

Optionally, the identification information acquisition module 100 is specifically configured to determine VID information and DID information of all connected network card devices from the acquired peripheral information and take the VID information and the DID information as corresponding identification information.

Optionally, the list acquisition module 200 is specifically configured to identify special network card devices from the identification information and establish a special device list on the basis of all identified special network card devices.

Optionally, identifying the special network card devices from the identification information may include:

identifying the special network card devices on the basis of VID information and DID information of the identification information.

Optionally, identifying the special network card devices from the identification information may include:
  performing mode simulation on all the network card devices corresponding to the identification information, determining network card devices only supporting low-level resources, and taking the network card devices of the low-level resources as the special network card devices.

Optionally, establishing the special device list on the basis of all identified special network card devices may include:
  establishing the special device list on the basis of VID information and DID information of the special network card devices.

Optionally, the resource allocation module 300 is specifically configured to acquire the boot mode of the BIOS, wherein the boot mode includes a 64-bit resource boot mode and a 32-bit resource boot mode; and perform resource allocation on a currently connected network card device on the basis of the boot mode and the special device list.

Optionally, performing resource allocation on the currently connected network card device on the basis of the boot mode and the special device list may include:
  allocating resources of 32 bits or more to the currently connected network card device when the boot mode is the 64-bit resource boot mode; and allocating resources of 32 bits or less to network card devices matching the special device list when the boot mode is the 32-bit resource boot mode.

Optionally, performing resource allocation on the currently connected network card device on the basis of the boot mode and the special device list may include:
  allocating resources of 32 bits or more to the currently connected network card device when the boot mode is an UEFI mode; and allocating resources of 32 bits or less to network card devices matching the special device list when the boot mode is a Legacy mode.

Optionally, allocating resources of 32 bits or less to the network card devices matching the special device list may include:
  determining whether the identification information of the network card device matches the identification information in the special device list; and allocating resources of 32 bits or less to the network card device if the identification information of the network card device matches the identification information in the special device list.

Optionally, acquiring the boot mode of the BIOS may include:
  acquiring the boot mode of the BIOS through a system variable value.

Optionally, acquiring the boot mode of the BIOS includes:
  acquiring the boot mode of the BIOS through a Get Variable function.

Optionally, the apparatus may further include:
  a system booting module, configured to boot a system through a PXE after the resource allocation is completed.

It can be seen that in this embodiment, the identification information of all the network card devices is acquired, then the special device list is identified, and finally, on the basis of the boot mode and the special device list, resource allocation is performed on a network card device which is a special device, thereby avoiding the problem of errors in resource allocation, and improving the effect and reliability of resource allocation.

Figure 4:
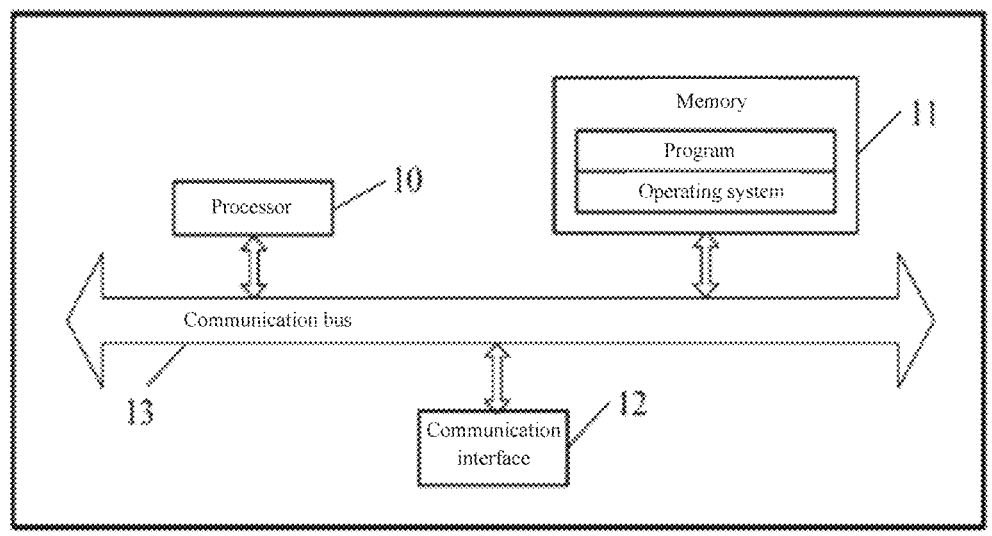
FIG. 4 is a schematic structural diagram of a server provided by an embodiment of the present application.

The present application also provides a server. Referring to FIG. 4, it is a schematic structural diagram of a server provided by an embodiment of the present application. The server may include:
  a memory, configured to store a computer program; and
  a processor, configured to implement the steps of any one of the above-mentioned resource allocation methods for peripherals when executing the computer program.

As shown in FIG. 4, it is a schematic structural diagram of a composition of the server. The server may include: a processor 10, a memory 11, a communication interface 12, and a communication bus 13. The processor 10, the memory 11, and the communication interface 12 are all communicated with each other through the communication bus 13.

In the embodiments of the present application, the processor 10 may be a Central Processing Unit (CPU), an application specific integrated circuit, a digital signal processor, a field programmable gate array, or other programmable logic devices.

The processor 10 may call a program stored in the memory 11. Specifically, the processor 10 may perform operations in the embodiment of the anomalous IP identification method.

The memory 11 is configured to store one or more programs, and the programs may include program codes. The program codes include computer operation instructions. In the embodiments of the present application, the memory 11 stores at least a program configured to realize the following functions:
  determining identification information of all network card devices from acquired peripheral information;
  establishing a special device list on the basis of the identification information; and
  performing resource allocation on a currently connected device on the basis of a boot mode of a BIOS and the special device list.

In one possible implementation, the memory 11 may include a program storage area and a data storage area. The program storage area may store an operating system, an application program required for at least one function, etc. The data storage area may store data created during use.

In addition, the memory 11 may include a high-speed random access memory (RAM) and a non-volatile memory, such as at least one magnetic disk storage device or other volatile solid-state storage devices.

The communication interface 12 may be an interface of a communication module and configured to connect to other devices or systems.

Of course, it should be noted that the structure shown in FIG. 4 does not limit the server in the embodiments of the present application. In practical application, the server may include more or less components than those shown in FIG. 4 or a combination of some components.

It can be seen that in this embodiment, the identification information of all the network card devices is acquired, then the special device list is identified, and finally, on the basis of the boot mode and the special device list, resource allocation is performed on a network card device which is a special device, thereby avoiding the problem of errors in resource allocation, and improving the effect and reliability of resource allocation.

Figure 5:
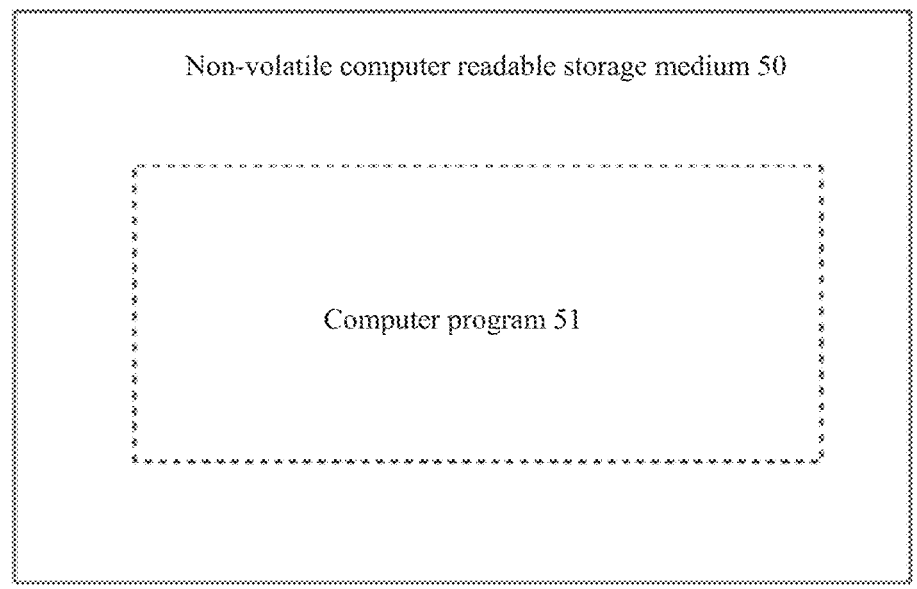
FIG. 5 is a schematic structural diagram of a non-volatile computer readable storage medium provided by an embodiment of the present application.

As shown in FIG. 5, the present application also provides a non-volatile computer readable storage medium 50, having stored thereon a computer program 501 which, when executed by a processor, implements the steps of any one of the above-mentioned resource allocation methods for peripherals.

The non-volatile computer readable storage medium 50 may include various media capable of storing the program codes, such as a USB flash disk, a removable hard disk, a ROM, a RAM, a magnetic disk, or an optical disk.

For a description of the non-volatile computer readable storage medium provided by the present application, reference is made to the above-mentioned method embodiments, and the description thereof will not be repeated here.

Various embodiments are described in the specification in a progressive manner, with each embodiment focusing on differences from the other embodiments, and with reference to the same or similar parts of the various embodiments. The apparatus disclosed in the embodiment is relatively simple to describe, since it corresponds to the method disclosed in the embodiment, and relevant parts may refer to the description in the method section.

A person skilled in the art may further appreciate that the units and algorithm steps of the embodiments described in conjunction with the embodiments disclosed herein may be implemented in electronic hardware, computer software, or a combination of the two. The composite and steps of the embodiments have been described above generally in terms of their functions for the sake of clarity and interchangeability of hardware and software. Whether these functions are implemented in hardware or software depends on the specific application and design constraints of the technical solutions. A person skilled in the art may use different methods to achieve the described function for each particular application, but this implementation shall not be considered outside the scope of the present application.

The steps of the method or algorithm described in conjunction with the embodiments disclosed herein may be implemented directly in hardware, in a software module executed by a processor, or in a combination of the two. A software module may be placed in a RAM, a memory, a ROM, an electrically programmable ROM, an electrically erasable programmable ROM, a register, a hard disk, a removable disk, a CD-ROM, or any other form of storage medium known in the art.

The resource allocation method and apparatus for a peripheral, the server, and the non-volatile computer readable storage medium provided by the present application are described in detail above. Specific examples are applied herein to illustrate the principles and implementations of the present application, and the above illustrations of the embodiments are only used to help understand the method of the present application and its core ideas. It should be noted that for a person skilled in the art, several improvements and modifications may be made without departing from the principles of the present application, and these improvements and modifications fall within the scope of the present application.

What is claimed is:

1. A resource allocation method for a peripheral, comprising:
   determining identification information of all network card devices from acquired peripheral information;
   establishing a special device list on a basis of the identification information, wherein the special device list is used for recording special network card devices; and
   performing resource allocation on a currently connected device on a basis of a boot mode of a basic input output system (BIOS) and the special device list, wherein the boot mode comprises a 64-bit resource boot mode and a 32-bit resource boot mode.

2. The resource allocation method according to claim 1, wherein the determining identification information of all network card devices from acquired peripheral information comprises:
   acquiring peripheral information of all peripherals through a peripheral component interconnection standard protocol to yield the acquired peripheral information; and
   acquiring the identification information of all the network card devices from the acquired peripheral information.

3. The resource allocation method according to claim 2, wherein the acquiring the identification information of all the network card devices from the acquired peripheral information comprises:
   acquiring information of all the network card devices from the acquired peripheral information; and
   acquiring Vendor Identification (VID) information and Device Identification (DID) information from the information of all the network card devices as corresponding identification information.

4. The resource allocation method according to claim 2, wherein the acquiring peripheral information of all peripherals through a peripheral component interconnection standard protocol to yield the acquired peripheral information comprises:
   acquiring the peripheral information of all the peripherals through the peripheral component interconnection standard protocol and corresponding interfaces.

5. The resource allocation method according to claim 1, wherein the determining identification information of all network card devices from acquired peripheral information comprises:
   determining Vendor Identification (VID) information and Device Identification (DID) information of all connected network card devices from the acquired peripheral information; and
   taking the VID information and the DID information as corresponding identification information.

6. The resource allocation method according to claim 1, wherein the establishing a special device list on a basis of the identification information comprises:
   identifying the special network card devices from the identification information; and
   establishing the special device list on a basis of all identified special network card devices.

7. The resource allocation method according to claim 6, wherein the identifying the special network card devices from the identification information comprises:
   identifying the special network card devices on a basis of Vendor Identification (VID) information and Device Identification (DID) information of the identification information.

8. The resource allocation method according to claim 6, wherein the identifying the special network card devices from the identification information comprises:
   performing mode simulation on all the network card devices corresponding to the identification information, determining network card devices only supporting low-level resources, and taking the network card devices of the low-level resources as the special network card devices.

9. The resource allocation method according to claim 6, wherein the establishing the special device list on a basis of all identified special network card devices comprises:

establishing the special device list on the basis of Vendor Identification (VID) information and Device Identification (DID) information of the special network card devices.

10. The resource allocation method according to claim 1, wherein the performing resource allocation on a currently connected device on a basis of a boot mode of a BIOS and the special device list comprises:
    acquiring the boot mode of the BIOS; and
    performing the resource allocation on a currently connected network card device on the basis of the boot mode and the special device list.

11. The resource allocation method according to claim 10, wherein the performing the resource allocation on a currently connected network card device on the basis of the boot mode and the special device list comprises:
    in response to the boot mode being the 64-bit resource boot mode, allocating resources of 32 bits or more to the currently connected network card device; and
    in response to the boot mode being the 32-bit resource boot mode, allocating resources of 32 bits or less to network card devices matching the special device list.

12. The resource allocation method according to claim 10, wherein the performing the resource allocation on a currently connected network card device on the basis of the boot mode and the special device list comprises:
    in response to the boot mode being a Unified Extensible Firmware Interface (UEFI) mode, allocating resources of 32 bits or more to the currently connected network card device; and
    in response to the boot mode being a Legacy mode, allocating resources of 32 bits or less to network card devices matching the special device list.

13. The resource allocation method according to claim 12, wherein the allocating resources of 32 bits or less to network card devices matching the special device list comprises:
    in response to the identification information of the currently connected network card device matching the identification information in the special device list, allocating resources of 32 bits or less to the currently connected network card device.

14. The resource allocation method according to claim 13, further comprising:
    in response to the identification information of the currently connected network card device not matching the identification information in the special device list, allocating resources of 32 bits or more to the currently connected network card device.

15. The resource allocation method according to claim 10, wherein the acquiring the boot mode of the BIOS comprises:
    acquiring the boot mode of the BIOS through a system variable value.

16. The resource allocation method according to claim 10, wherein the acquiring the boot mode of the BIOS comprises:
    acquiring the boot mode of the BIOS through a GetVariable function.

17. The resource allocation method according to claim 1, further comprising:
    booting a system through a Preboot eXecution Environment (PXE) after the resource allocation is completed.

18. The resource allocation method according to claim 6, wherein the special network card devices are network card devices with limited allocated resources in the boot mode.

19. A server, comprising:
    a memory, configured to store computer readable instructions; and
    a processor, configured to execute the computer readable instructions, wherein upon execution by the processor, the processor is configured to:
        determine identification information of all network card devices from acquired peripheral information;
        establish a special device list on a basis of the identification information, wherein the special device list is used for recording special network card devices; and
        perform resource allocation on a currently connected device on a basis of a boot mode of a basic input output system (BIOS) and the special device list, wherein the boot mode comprises a 64-bit resource boot mode and a 32-bit resource boot mode.

20. A computer readable storage medium, having stored thereon computer readable instructions executable by one or more processors, wherein the computer readable instructions, upon execution by the one or more processors, are figured to cause the one or more processors to: determine identification information of all network card devices from acquired peripheral information;
    establish a special device list on a basis of the identification information, wherein the special device list is used for recording special network card devices; and
    perform resource allocation on a currently connected device on a basis of a boot mode of a basic input output system (BIOS) and the special device list, wherein the boot mode comprises a 64-bit resource boot mode and a 32-bit resource boot mode.

\* \* \* \* \*